Patented Aug. 17, 1954

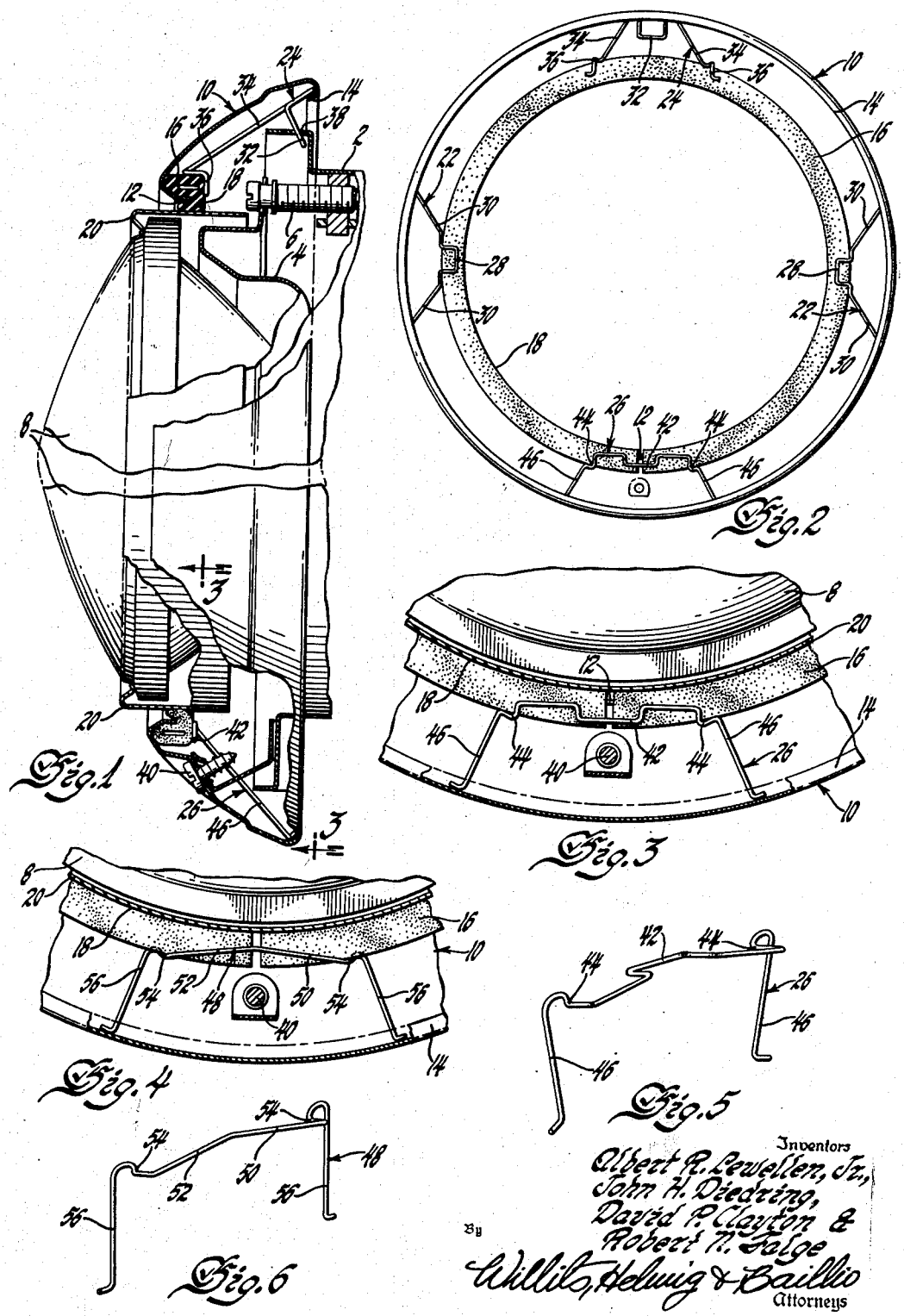

2,686,867

UNITED STATES PATENT OFFICE 2,686,867

HEADLIGHT GASKET FASTENING DEVICE

Albert R. Lewellen, Jr., Detroit, Mich., and John H. Diedring, David P. Clayton, and Robert N. Falge, Anderson, Ind., assignors to General Motors Corporation, Detroit, Mich., a corporation of Delaware Application September 20, 1950, Serial No. 185,888

6 Claims. (Cl. 240—41)

The present invention relates to devices for mounting unitary headlamp assemblies commonly referred to as sealed beam lamps on automotive vehicles and more particularly to fasteners for such devices.

A headlamp mounting device which is used extensively in the automotive industry at the present time for mounting sealed beam headlamps comprising a lens, reflector and light source sealed as a unit includes a socket member adapted for attachment to the vehicle body usually recessed in an aperture in the front fenders, a ball member slidably engaging the socket member and adjustable in horizontal and vertical intersecting planes to provide substantially universal movement of the ball member in the socket member and means for securing a lamp unit of the sealed beam type to the ball member. To conceal the adjusting means, and means for attaching the sealed beam lamp to the ball member, a bezel or frame is provided which surrounds the lens portion of the lamp unit and is secured to the socket member of the mounting device.

With such an arrangement there is an annular space between the lamp unit and the bezel which permits the entrance of water and other harmful material. To avoid this condition a rubber sealing ring is provided to fill the space. The sealing ring is secured to the bezel by fasteners.

The sealing ring generally consists of a length of rubber material of suitable cross-section fitted to the bezel around its inner edge with the two ends adjacent. Heretofore there has been no completely satisfactory means for securing these ends to the bezel, consequently the dangling ends interfere with the assembling of the bezel to the supporting socket member structure.

Accordingly it is an object of the present invention to provide a fastening device particularly adapted to secure the ends of the sealing ring to the bezel to avoid dangling ends and the consequent interference with assembly of the bezel to the headlamp mounting device.

This and other objects are attained in accordance with the present invention by providing a spring wire fastening device so constructed as to provide a middle portion adapted to extend along the end portions of the adjacent ends of the ring with lateral gripping portions at the ends formed to the surface of the ring for gripping the ring and legs extending from the gripping portions and adapted to engage an edge of the bezel to retain the ring in position.

For a better understanding of the invention reference may be had to the drawing in which Figure 1 is an elevational view partly in cross-section and partly broken away of a headlamp mounting device embodying the present invention; Figure 2 is an elevational rear view of the mounting device bezel illustrating the sealing ring and fastening means for securing the sealing ring to the bezel; Figure 3 is an enlarged fragmentary view taken along the line 3—3 of Figure 1 illustrating one form of fastening device of the present invention; Figure 4 is a view similar to Figure 3 illustrating a modification of the present invention and Figures 5 and 6 are perspective views respectively of the fastening devices illustrated in Figures 3 and 4.

Referring now to the drawing and particularly to Figure 1 there is illustrated a headlamp mounting device such as these commonly in use on automotive vehicles at the present time. It comprises a socket member 2 adapted for recessed mounting in an aperture of the body or fender of a vehicle, a ball member 4 universally mounted in the socket member for adjustment by threaded members such as 6. Secured to the ball member 4 by suitable means (not shown) is a unitary lamp assembly 8 of the sealed beam lamp type. A bezel 10 surrounds the lamp unit 8, ball and socket members 4 and 2 respectively to conceal the adjusting means and provide a contoured surface blending in with the vehicle body or fender portion to which the headlamp mounting device is attached. Opposite edges of the bezel are inturned at 12 and 14 as shown. Supported in the channel formed by the bezel edge 12 is a sealing ring 16 of resilient material such as rubber. As shown in Figure 1 the body of the sealing ring 16 is formed to fit into the bezel channel formed by inturned edge 12 and has an inwardly extending flange 18 which engages the clamping ring 20 of the mounting device assembly to seal the space between the clamping ring and the bezel. The sealing ring 16 is held in place on the bezel by a plurality of fasteners 22, 24 and 26, Figure 2. Fasteners 22 are provided with gripping portions 28 which engage the sealing ring and legs 30, the ends of which are seated in the channel of the bezel formed by the inturned edge 14. Fastener 24 is formed with a downwardly depending portion 32. Formed adjacent the downwardly depending portion 32 are loops which engage the channel of the bezel formed by the inturned edge 14 and legs 34 provided with gripping ends 36 which engage the sealing ring 16. The downwardly depending portion 32 of fastener 24 is adapted to be recessed in a slot 38 in the socket member 2, Figure 1, to pivotally mount the bezel on the socket member. The bezel is secured to the socket member 2 by a threaded member 40. The respective fasteners 22 and 24 are disclosed and claimed in applications Serial Number 123,015, filed October 22, 1949, and Serial Number 123,014, filed October 22, 1949, now Patent Number 2,647,984, and assigned to the assignee of the present application.

Fastener 26 comprises a spring wire member which includes an elongated and undulated body portion 42 adapted to engage the rear surface of the adjacent end portions of the sealing ring 16, as shown. Extending from loops 44 are legs 46 with ends in engagement with the bezel channel formed by inturned edge 14. In applying this fastener 26, the legs 46 are spread apart and their inherent tendency to return to their original positions firmly holds the ends of the sealing ring in the channel 12. With this form of fastener there is sufficient length of the middle portion to engage and hold substantial portions adjacent the ends of the sealing ring 16 to prevent the ends dangling and any consequent interference in assembling of the bezel and ring on the headlamp mounting device.

Another form of fastener 48 is illustrated in Figures 4 and 6 and is substantially the same as fastener 26 except that the middle portion is comprised of two mutually inclined legs 50 and 52 with loops 54 at the ends thereof for gripping the surface of the sealing ring. Legs 56 extending from the loops 54 engage the bezel channel formed by the inturned edge 14 to hold the ring in place.

What we claim as new and desire to secure by Letters Patent of the United States is:

1. In combination, a bezel, said bezel being provided with inwardly extending flanges at the opposite edges thereof, a length of resilient material mounted in one flanged edge of said bezel with the ends juxtaposed, a fastener for securing the juxtaposed ends of said resilient material in one of the flanged edges of said bezel, said fastener having a portion engaging a substantial length of said material adjacent its ends and legs extending therefrom and in engagement with the oppositely disposed flange of said bezel.

2. In combination, a door frame for automobile headlamp mounting devices, said door frame being provided with inwardly extending flanges at the opposite edges thereof, a length of resilient gasket mounted in one flanged edge of said door frame with the ends thereof in juxtaposition, a wire fastener for securing the juxtaposed ends of said resilient material in the flanged edge of said door frame, said fastener having an undulated head portion in engagement with substantial portions of one surface of the juxtaposed ends of said gasket, return-bent portions extending from the ends of said head portion in engagement with another surface of the gasket and legs extending from said return-bent portions and in engagement with the other flange of said door frame.

3. In combination, a door frame for an automobile headlamp mounting device, said door frame being provided with inwardly extending flanges at the opposite edges thereof, a length of resilient gasket mounted in one flanged edge of said door frame with the ends thereof in juxtaposition, a wire fastener for securing the juxtaposed ends of said resilient gasket in one of the flanged edges of said door frame, said fastener having a gasket-engaging head comprising outwardly and angularly disposed legs in engagement with one surface of the juxtaposed ends of said gasket, return-bent portions extending from said legs and in engagement with another surface of said gasket, and legs extending from return-bent portions and in engagement with the other flange of said door frame.

4. In combination, a door frame for an automobile headlamp mounting device, said door frame being provided with inwardly extending flanges at the opposite edges thereof, a length of resilient gasket mounted in one flanged edge of said door frame with the ends thereof in juxtaposition, a wire fastener for securing the juxtaposed ends of said resilient gasket in one of the flanged edges of said door frame, said fastener having a gasket engaging head comprising a plurality of engaging portions interconnected by laterally disposed portions, said head being in engagement with one surface of the juxtaposed ends of said gasket, return-bent portions extending from the oppositely disposed ends of said head and in engagement with another surface of said gasket and legs extending from said return-bent portions and in engagement with the other flanged edge of said door frame and holding the gasket therein.

5. A wire fastening device for securing the juxtaposed ends of a gasket in the flanged edge of the door frame of a headlamp mounting device, said fastening device comprising a gasket-engaging head portion including a plurality of lengths interconnected by transverse portions to engage one surface of the juxtaposed ends of said gasket, return-bent portions extending from the opposite ends and to one side of said head portion for gripping the peripheral surface of said gasket and legs extending from said return-bent portions to the other side of said head portion for engaging the door frame and securing the gasket therein.

6. In combination, a bezel, said bezel being provided with inwardly extending flanges at the opposite edges thereof, a length of resilient material mounted in one flanged edge of said bezel with the ends juxtaposed, a fastener for securing the juxtaposed ends of said resilient material in one of the flanged edges of said bezel, said fastener having one portion engaging a substantial length of said material adjacent one of said juxtaposed ends and another portion engaging a substantial length of said material adjacent the other of said juxtaposed ends and legs extending from said portions and in engagement with the oppositely disposed flange of said bezel.

References Cited in the file of this patent

UNITED STATES PATENTS

| Number | Name | Date |
| --- | --- | --- |
| 1,788,728 | Mead | Jan. 13, 1931 |
| 2,266,329 | Mead et al. | Dec. 16, 1941 |
| 2,283,663 | Bugg | May 19, 1942 |

FOREIGN PATENTS

| Number | Country | Date |
| --- | --- | --- |
| 529,329 | Great Britain | Nov. 19, 1940 |
| 701,935 | Germany | Jan. 27, 1941 |